(12) United States Patent
Khawand et al.

(10) Patent No.: US 7,487,271 B2
(45) Date of Patent: Feb. 3, 2009

(54) METHOD AND APPARATUS USING BUFFER POOLS AND ARRAYS OF BUFFER POINTERS FOR SHARING MEMORY IN A MULTIPROCESSOR SYSTEM

(75) Inventors: Charbel Khawand, Miami, FL (US); Jean Khawand, Miami, FL (US); Bin Liu, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 502 days.

(21) Appl. No.: 11/233,597

(22) Filed: Sep. 22, 2005

(65) Prior Publication Data
US 2007/0067511 A1     Mar. 22, 2007

(51) Int. Cl.
*G06F 3/00* (2006.01)
*G06F 12/00* (2006.01)
*G06F 15/00* (2006.01)

(52) U.S. Cl. ............................ 710/52; 710/53; 710/54; 710/55; 710/56; 710/57; 711/100; 712/10; 712/28

(58) Field of Classification Search .................. None
See application file for complete search history.

(56) References Cited

U.S. PATENT DOCUMENTS

| | | | |
|---|---|---|---|
| 5,859,981 A | * | 1/1999 | Levin et al. ................. 709/238 |
| 6,738,974 B1 | | 5/2004 | Nageswaran et al. |
| 2004/0039884 A1 | | 2/2004 | Li |
| 2004/0194096 A1 | | 9/2004 | Armstrong et al. |
| 2004/0215773 A1 | | 10/2004 | Strait et al. |
| 2004/0215858 A1 | | 10/2004 | Armstrong et al. |

OTHER PUBLICATIONS

Andrew S. Tanenbaum, "Operating Systems: Design and Implementation", 1987, pp. 60-62 and 198-206, Prentice-Hall, Inc., Englewood Cliffs, New Jersey.
Jim Handy, The Cache Memory Book, 1993, pp. 140-158, Academic Press, Inc., San Diego, California.

* cited by examiner

*Primary Examiner*—Alan Chen
(74) *Attorney, Agent, or Firm*—Akerman Senterfitt; Scott M. Garrett

(57) ABSTRACT

A multiprocessor system (100) for sharing memory has a memory (102), and two or more processors (104). The processors are programmed to establish (202) memory buffer pools between the processors, and for each memory buffer pool, establish (204) an array of buffer pointers that point to corresponding memory buffers. The processors are further programmed to, for each array of buffer pointers, establish (206) a consumption pointer for the processor owning the memory buffer pool, and a release pointer for another processor sharing said memory buffer pool, each pointer initially pointing to a predetermined location of the array, and adjust (208-236) the consumption and release pointers according to buffers consumed and released.

20 Claims, 2 Drawing Sheets

METHOD AND APPARATUS USING BUFFER POOLS AND ARRAYS OF BUFFER POINTERS FOR SHARING MEMORY IN A MULTIPROCESSOR SYSTEM

FIELD OF THE INVENTION

This invention relates generally to multiprocessor systems, and more particularly to a method and apparatus for sharing memory in a multiprocessor system.

BACKGROUND OF THE INVENTION

Typically, memory sharing between processors is accomplished by way of a semaphore—a classic method for restricting access to shared memory in a multi-processing environment. Semaphores are often managed by an API (Application Programming Interface) in the form of library calls. For real-time applications (such as streaming video) such calls may take too long and thereby impact the performance of the application in such a way that is noticeable to an end user.

A need therefore arises to improve the performance of shared memory applications in a multiprocessor system.

SUMMARY OF THE INVENTION

Embodiments in accordance with the invention provide a method and apparatus for sharing memory in a multiprocessor system.

In a first embodiment of the present invention, a method for sharing memory in a multiprocessor system. The method has the steps of establishing memory buffer pools for two or more processors, and for each memory buffer pool, establishing an array of buffer pointers that point to corresponding memory buffers. The method further has the steps of, for each array of buffer pointers, establishing a consumption pointer for the processor owning the memory buffer pool, and a release pointer for another processor sharing said memory buffer pool, each pointer initially pointing to a predetermined location of the array. The method further includes the step of adjusting the consumption and release pointers according to buffers consumed and released.

In a second embodiment of the present invention, a multiprocessor system has computer-readable storage mediums for sharing memory. The storage mediums have computer instructions for establishing memory buffer pools between the processors, and for each memory buffer pool, establishing an array of buffer pointers that point to corresponding memory buffers. The storage mediums further have computer instructions for establishing at each array of buffer pointers a consumption pointer for the processor owning the memory buffer pool, and a release pointer for another processor sharing said memory buffer pool, each pointer initially pointing to a predetermined location of the array. The storage mediums further includes computer instructions for adjusting the consumption and release pointers according to buffers consumed and released.

In a third embodiment of the present invention, a multiprocessor system for sharing memory has a memory, and two or more processors. The processors are programmed to establish memory buffer pools between the processors, and for each memory buffer pool, establish an array of buffer pointers that point to corresponding memory buffers. The processors are further programmed to, for each array of buffer pointers, establish a consumption pointer for the processor owning the memory buffer pool, and a release pointer for another processor sharing said memory buffer pool, each pointer initially pointing to a predetermined location of the array. The processor is further programmed to adjust the consumption and release pointers according to buffers consumed and released.

DETAILED DESCRIPTION

Figure 1:
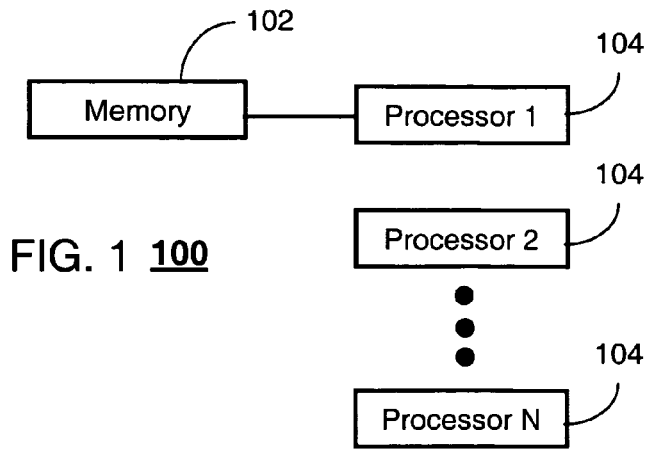
FIG. 1 is a block diagram of a multiprocessor system according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is a block diagram of a multiprocessor system 100 according to an embodiment of the present invention. The multiprocessor system 100 comprises a memory 102 and two or more processors 104. The memory 102 can be any conventional storage device such a mass storage disk drive, RAM, SRAM, DRAM, Flash, and/or like read-writeable storage media. The processor 104 can be any conventional computing technology such as a microprocessor, and/or DSP (Digital Signal Processor). The multiprocessor system 100 according to the present invention can be used by any number of conventional devices including without limitation cellular phones, PDAs (Personal Digital Assistants), laptop computers, and desktop computers, just to mention a few. The multiprocessor system 100 can also operate any conventional software application that makes use of multiprocessor resources.

Figure 2:
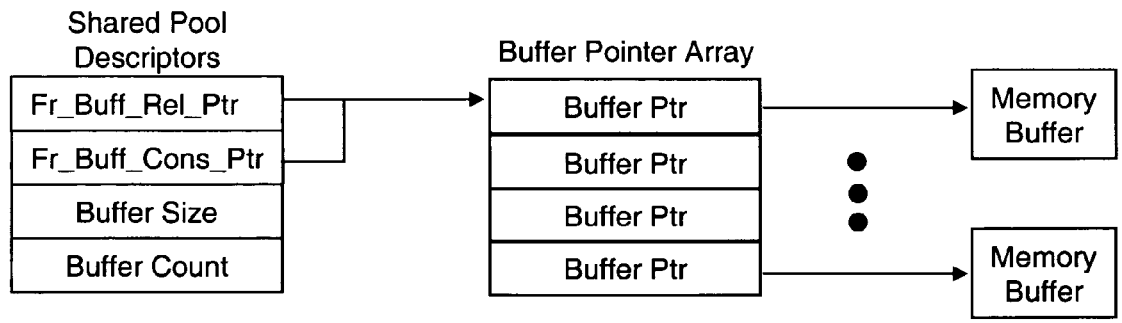
FIG. 2 is a block diagram of memory buffer pools used by each of the processors of FIG. 1 according to an embodiment of the present invention.
Figure 2:
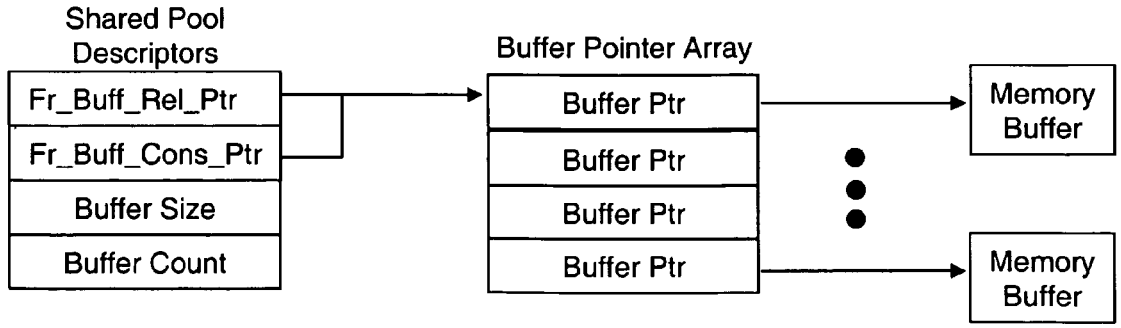
Figure 3:
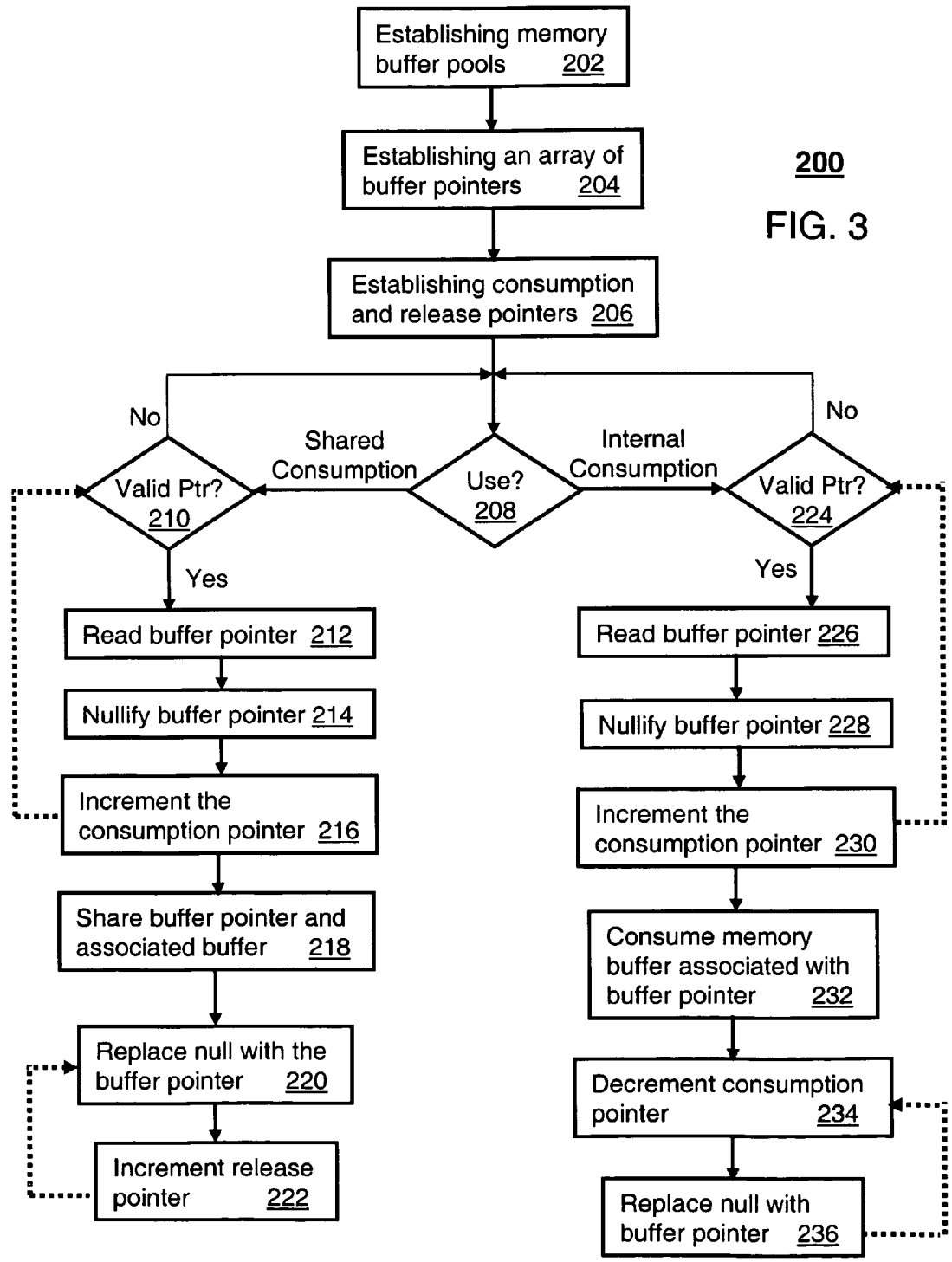
FIG. 3 is a flowchart depicting a method operating in each of the processors of the multiprocessor system according to an embodiment of the present invention.

FIG. 3 is a flowchart depicting a method 200 operating in each of the processors 104 of the multiprocessor system 100 for sharing memory among said processors 104 according to an embodiment of the present invention. Method 200 begins with step 202 where each processor 104 establishes memory buffer pools 110 and 120 as shown in FIG. 2. In step 204, an array of buffer pointers that point to corresponding memory buffers is established for each buffer pool. These arrays are in turn referenced in step 206 by release and consumption pointers depicted as Fr_Buff_Rel_Ptr (Free Buffer Release Pointer) and Fr_Buff_Cons_Ptr (Free Buffer Consumption Pointer), respectively, in the shared pool descriptor area. The shared pool descriptor can further include a buffer size and a buffer count. The buffer size indicates the storage capacity (in bytes, words, long words or otherwise) of each memory buffer, while the buffer count indicates how many buffer pointers and corresponding memory buffers are available in the memory buffer pool.

Initially each of the release and consumption pointers point to a predetermined location of the buffer pointer array. In the present illustration, the pointers point to the beginning of the array. It will be appreciated, however, that other starting points in the array can be used. The buffer pools of FIG. 2 can be shared between processors 104 or internally consumed. Accordingly, in step 208 each processor 104 makes a determination whether the memory pool usage will be internal or shared. If shared, the processor 104 proceeds to step 210 to determine if the consumption pointer points to a null. A null in the present context means a nonexistent or unavailable pointer. It would be obvious to one of ordinary skill in the art that any technique to signify a null can be applied to the present invention. When a condition such as this is detected, it represents that the memory buffer pool is full (i.e., no available free memory is present). Under such conditions, the processor 104 can be programmed to repeat steps 208 and 210 until such time that one or more memory buffers are freed.

If, on the other hand, an available buffer pointer is detected, the processor proceeds to step 212 where it reads the buffer pointer into its internal memory to determine where to access the memory buffer. To recognize the consumption of this memory buffer, the processor 104 proceeds to step 214 where it nullifies the buffer pointer just read from the buffer pointer array, and thereafter increments the consumption pointer 216. Depending on how many buffers are needed, the processor 104 can repeat steps 210 through 216 as many times as desired (in a modulo fashion depending on the buffer count). Once the processor 104 has acquired all the memory buffers it needs, it proceeds to step 218 where it shares the buffer pointer(s) and associated memory buffers with another processor 104. Any means for communicating the shared memory with the other processor 104 (such as message buffers—not shown) can be used.

Once the other processor 104 has consumed the shared memory (i.e., has performed all necessary tasks on the shared memory and no longer has a need for the shared memory buffers), it proceeds to step 220 where it replaces the null pointed to by the release pointer (as created in step 214 by the processor 104 owning the memory pool) with the shared buffer pointer supplied to said processor 104. For each null replaced by a shared buffer pointer, the release pointer is incremented to the next location of the buffer pointer array. Steps 220 and 222 are repeated for as many buffer pointers as need to be released (freed).

Thus, as buffer pointers and corresponding memory buffers are shared between processors 104, the recipient processor accepting the shared memory autonomously replenishes the shared memory as soon as it no longer has use for said memory. The autonomous action of consuming and releasing buffers between processors 104 just described is a substantial performance improvement over prior art systems that utilize time consuming semaphore library calls.

When the processor 104 intends to consume memory buffers for itself, it proceeds to steps 224 through 230. These steps are the same in operation as was described for steps 210 through 216. That is, the processor 104 retrieves buffer pointers as needed, nullifies their existence, and increments the consumption pointer depending on the number of memory buffers retrieved. In step 232, the memory buffers retrieved in the foregoing steps are consumed by the processor 104. Once consumed, the consumption pointer is decremented in step 234, and the null previously created is replaced with the consumed buffer pointer, thereby releasing (freeing) said pointer and its associated memory buffer for future use. Steps 234 and 236 are repeated as many times as needed to release the consumed memory buffers no longer needed by the processor 104.

The foregoing embodiments can be easily applied so that one processor 104 can easily share memory with two or more processors. Additionally, in instances where a processor 104 can dynamically communicate with new processors, said processor can be programmed to adjust its memory pools to accommodate memory sharing with the additional processor. For example, a processor 104 having a memory pool of 1 Mbytes of buffer space, can rearrange this buffer pool into two buffer pools of 500 Kbytes having the structure of FIG. 2 and operating according to method 200. Such rearrangement can be repeated (or undone) as many times as may be necessary to add or remove memory sharing in a multiprocessor environment.

It should be evident to the reader that the embodiments in accordance with the present invention can be realized in hardware, software, or a combination of hardware and software. Thus, the embodiments can be embedded in a computer program product, which comprises all the features enabling the implementation of the methods described herein, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident that the embodiments in accordance with the present invention may be used in many arrangements. Thus, although the description is made for particular arrangements and methods, the intent and concepts herein are suitable and applicable to other arrangements not described herein. It would be clear therefore to those skilled in the art that modifications to the disclosed embodiments described can be effected without departing from the spirit and scope of the invention.

Accordingly, the described embodiments ought to be construed to be merely illustrative of some of the more prominent features and applications of the embodiments of the present invention. It should also be understood that the claims are intended to cover the structures described herein as performing the recited function and not only structural equivalents. Therefore, equivalent structures that read on the description are to be construed to be inclusive of the scope as defined in the following claims. Thus, reference should be made to the following claims, rather than to the foregoing specification, as indicating the scope of the embodiments of the present invention.

What is claimed is:

1. A method for sharing memory in a multiprocessor system, comprising the steps of:
    establishing memory buffer pools for two or more processors;
    for each memory buffer pool, establishing an array of buffer pointers that point to corresponding memory buffers;
    for each array of buffer pointers, establishing a consumption pointer for the processor owning the memory buffer pool, and a release pointer for another processor sharing said memory buffer pool, each pointer initially pointing to a predetermined location of the array; and
    adjusting the consumption and release pointers according to buffers consumed and released.

2. The method of claim 1, consuming and releasing buffer pointers and corresponding memory buffers between processors according to the steps of:
    reading a buffer pointer pointed to by the consumption pointer;
    nullifying the buffer pointer;
    incrementing the consumption pointer to the next buffer pointer;
    sharing the consumed buffer pointer and its associated memory buffer between processors;
    replacing the null pointed to by the release pointer with the shared buffer pointer; and
    incrementing the release pointer.

3. The method of claim 2, comprising the steps of:
    validating prior to the reading step that the consumption pointer does not point to a null; and
    if a null is detected, ceasing the consumption operation until the consumption pointer points to an available buffer pointer.

4. The method of claim 1, consuming and releasing buffer pointers and corresponding memory buffers by a processor controlling said memory according to the steps of:
    reading a buffer pointer pointed to by the consumption pointer;
    nullifying the buffer pointer;
    incrementing the consumption pointer to the next buffer pointer;
    consuming the memory buffer associated with the consumed buffer pointer;
    decrementing the consumption pointer; and
    replacing the null pointed to by the decremented consumption pointer with the consumed buffer pointer, thereby releasing said pointer and its associated memory buffer.

5. The method of claim 4, comprising the steps of:
    validating prior to the reading step that the consumption pointer does not point to a null; and
    if a null is detected, ceasing the consumption operation until the consumption pointer points to an available buffer pointer.

6. The method of claim 1, comprising step of establishing for each memory buffer pool at least one among a buffer size corresponding to each of the memory buffers and a buffer count.

7. The method of claim 1, comprising step of adjusting at a processor its memory buffer pools and corresponding consumption and release pointers to accommodate memory sharing with additional processors.

8. A multiprocessor system having computer-readable storage mediums for sharing memory, each of the storage mediums comprising computer instructions for:
    establishing memory buffer pools between the processors;
    for each memory buffer pool, establishing an array of buffer pointers that point to corresponding memory buffers;
    for each array of buffer pointers, establishing a consumption pointer for the processor owning the memory buffer pool, and a release pointer for another processor sharing said memory buffer pool, each pointer initially pointing to a predetermined location of the array; and
    adjusting the consumption and release pointers according to buffers consumed and released.

9. The storage mediums of claim 8, comprising computer instructions for:
    reading a buffer pointer pointed to by the consumption pointer;
    nullifying the buffer pointer;
    incrementing the consumption pointer to the next buffer pointer;
    sharing the consumed buffer pointer and its associated memory buffer between processors;
    replacing the null pointed to by the release pointer with the shared buffer pointer; and
    incrementing the release pointer.

10. The storage mediums of claim 9, comprising computer instructions for:
    validating prior to the reading step that the consumption pointer does not point to a null; and
    if a null is detected, ceasing the consumption operation until the consumption pointer points to an available buffer pointer.

11. The storage mediums of claim 8, comprising computer instructions for:
    reading a buffer pointer pointed to by the consumption pointer;
    nullifying the buffer pointer;
    incrementing the consumption pointer to the next buffer pointer;
    consuming the memory buffer associated with the consumed buffer pointer;
    decrementing the consumption pointer; and
    replacing the null pointed to by the decremented consumption pointer with the consumed buffer pointer, thereby releasing said pointer and its associated memory buffer.

12. The storage mediums of claim 11, comprising computer instructions for:
    validating prior to the reading step that the consumption pointer does not point to a null; and
    if a null is detected, ceasing the consumption operation until the consumption pointer points to an available buffer pointer.

13. The storage mediums of claim 8, comprising computer instructions for establishing for each memory buffer pool at least one among a buffer size corresponding to each of the memory buffers and a buffer count.

14. The storage mediums of claim 8, comprising computer instructions for adjusting at a processor its memory buffer pools and corresponding consumption and release pointers to accommodate memory sharing with additional processors.

15. A multiprocessor system for sharing memory, comprising:
    a memory; and
    two or more processors, each processor programmed to:
    establish memory buffer pools between the processors;
    for each memory buffer pool, establish an array of buffer pointers that point to corresponding memory buffers;
    for each array of buffer pointers, establish a consumption pointer for the processor owning the memory buffer pool, and a release pointer for another processor sharing said memory buffer pool, each pointer initially pointing to a predetermined location of the array; and
    adjust the consumption and release pointers according to buffers consumed and released.

16. The multiprocessor system of claim 15, wherein the processors are programmed to:
    read a buffer pointer pointed to by the consumption pointer;
    nullify the buffer pointer;
    increment the consumption pointer to the next buffer pointer;
    share the consumed buffer pointer and its associated memory buffer between processors;
    replace the null pointed to by the release pointer with the shared buffer pointer; and
    increment the release pointer.

17. The multiprocessor system of claim 16, wherein the processors are programmed to:
    validate prior to the reading step that the consumption pointer does not point to a null; and
    if a null is detected, cease the consumption operation until the consumption pointer points to an available buffer pointer.

18. The multiprocessor system of claim 15, wherein the processors are programmed to:
    read a buffer pointer pointed to by the consumption pointer;
    nullify the buffer pointer;

increment the consumption pointer to the next buffer pointer;

consume the memory buffer associated with the consumed buffer pointer;

decrement the consumption pointer; and replace the null pointed to by the decremented consumption pointer with the consumed buffer pointer, thereby releasing said pointer and its associated memory buffer.

19. The multiprocessor system of claim 18, wherein the processors are programmed to:

validate prior to the reading step that the consumption pointer does not point to a null; and if a null is detected, cease the consumption operation until the consumption pointer points to an available buffer pointer.

20. The multiprocessor system of claim 15, wherein the processors are programmed to adjust at a processor its memory buffer pools and corresponding consumption and release pointers to accommodate memory sharing with additional processors.

* * * * *